US007631551B2

(12) United States Patent
Wang et al.

(10) Patent No.: US 7,631,551 B2
(45) Date of Patent: Dec. 15, 2009

(54) ADAPTIVE BAROMETRIC PRESSURE ESTIMATION IN WHICH AN INTERNAL COMBUSTION ENGINE IS LOCATED

(75) Inventors: Wenbo Wang, Novi, MI (US); John F. Van Gilder, Webberville, MI (US); Jill A Slimmer-Velez, Brighton, MI (US); Kurt D. Mc Lain, Clarkston, MI (US); Michael A. Kropinski, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 102 days.

(21) Appl. No.: 11/829,235

(22) Filed: Jul. 27, 2007

(65) Prior Publication Data

US 2009/0025469 A1 Jan. 29, 2009

(51) Int. Cl.
*G01M 15/00* (2006.01)

(52) U.S. Cl. .................................................. 73/114.37

(58) Field of Classification Search ............. 73/114.31, 73/114.33, 114.37

See application file for complete search history.

(56) References Cited

U.S. PATENT DOCUMENTS

| | | | | |
|---|---|---|---|---|
| 4,926,335 | A * | 5/1990 | Flowers et al. | 701/103 |
| 5,136,517 | A * | 8/1992 | Cullen et al. | 701/103 |
| 5,604,306 | A * | 2/1997 | Schricker | 73/114.31 |
| 5,631,412 | A * | 5/1997 | Tomisawa | 73/114.32 |
| 5,714,683 | A * | 2/1998 | Maloney | 73/114.33 |
| 6,016,460 | A * | 1/2000 | Olin et al. | 701/102 |
| 6,366,847 | B1 * | 4/2002 | Sun et al. | 701/103 |
| 6,430,515 | B1 * | 8/2002 | Sanyal et al. | 702/50 |
| 6,445,996 | B1 * | 9/2002 | Corbeels et al. | 701/104 |
| 6,834,542 | B2 * | 12/2004 | Aschner et al. | 73/114.33 |
| 6,944,530 | B2 * | 9/2005 | Russell et al. | 701/104 |
| 6,990,856 | B2 * | 1/2006 | Dempsey et al. | 73/114.33 |
| 7,293,452 | B2 * | 11/2007 | Vibert et al. | 73/114.36 |
| 7,379,801 | B2 * | 5/2008 | Heffington | 701/33 |
| 7,441,449 | B2 * | 10/2008 | Wang et al. | 73/114.31 |
| 7,444,234 | B2 * | 10/2008 | Bauerle | 701/114 |
| 7,509,845 | B2 * | 3/2009 | Wiggins et al. | 73/114.31 |
| 2008/0183366 | A1 * | 7/2008 | Bauerle | 701/103 |
| 2008/0190177 | A1 * | 8/2008 | Wiggins et al. | 73/49.7 |
| 2008/0223123 | A1 * | 9/2008 | Wang et al. | 73/114.31 |

* cited by examiner

*Primary Examiner*—Lisa M Caputo
*Assistant Examiner*—Freddie Kirkland, III

(57) ABSTRACT

A method of determining a barometric pressure of atmosphere, in which an internal combustion engine of a vehicle is located includes monitoring operating parameters of the internal combustion engine and the vehicle, determining a healthy status of an air filter of the internal combustion engine, and calculating the barometric pressure based on the operating parameters and the healthy status of the air filter.

23 Claims, 3 Drawing Sheets

ADAPTIVE BAROMETRIC PRESSURE ESTIMATION IN WHICH AN INTERNAL COMBUSTION ENGINE IS LOCATED

FIELD

The present disclosure relates to internal combustion engines, and more particularly to adaptively estimating a barometric pressure of an environment, within which an internal combustion is present.

BACKGROUND

The statements in this section merely provide background information related to the present disclosure and may not constitute prior art.

Internal combustion engines combust a fuel and air mixture to produce drive torque. More specifically, air is drawn into the engine through a throttle. The air is mixed with fuel and the air and fuel mixture is compressed within a cylinder using a piston. The air and fuel mixture is combusted within the cylinder to reciprocally drive the piston within the cylinder, which in turn rotationally drives a crankshaft of the engine.

Engine operation is regulated based on several parameters including, but not limited to, intake air temperature ($T_{PRE}$), manifold absolute pressure (MAP), throttle position (TPS), engine RPM and barometric pressure ($P_{BARO}$). With specific reference to the throttle, the state parameters (e.g., air temperature and pressure) before the throttle are good references that can be used for engine control and diagnostic. For example, proper functioning of the throttle can be monitored by calculating the flow through the throttle for a given throttle position and then comparing the calculated air flow to a measured or actual air flow. As a result, the total or stagnation air pressure before the throttle (i.e., the pre-throttle air pressure) is critical to accurately calculate the flow through the throttle. Alternatively, the total pressure and/or static pressure can be used to monitor air filter restriction.

Traditional internal combustion engines include a barometric pressure sensor that directly measures the $P_{BARO}$. However, such additional hardware increases cost and manufacturing time, and is also a maintenance concern because proper operation of each sensor must be monitored and the sensor must be replaced if not functioning properly.

SUMMARY

Accordingly, the present invention provides a method of determining a barometric pressure of atmosphere, in which an internal combustion engine of a vehicle is located. The method includes monitoring operating parameters of the internal combustion engine and the vehicle, determining a healthy status of an air filter of the internal combustion engine, and calculating the barometric pressure based on the operating parameters and the healthy status of the air filter.

In one feature, the method further includes determining a drag coefficient based on at least one of the operating parameters and the healthy status. The barometric pressure is calculated based on the drag coefficient.

In other features, the method further includes determining whether at least one of the operating parameters is less than a corresponding threshold. The healthy status of the air filter is determined based on a known barometric pressure if the at least one of the operating parameters is not less than the corresponding threshold. The at least one operating parameter includes a time difference between update times of the barometric pressure. The at least one operating parameter includes a travel distance of the vehicle.

In still other features, the healthy status is determined based on a pre-throttle inlet pressure. The pre-throttle inlet pressure is determined based on an intake air temperature. Alternatively, the pre-throttle inlet pressure is monitored using a sensor.

In yet another feature, the operating parameters comprise a mass air flow, an intake cross-sectional area, an air density and a pre-throttle inlet pressure.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
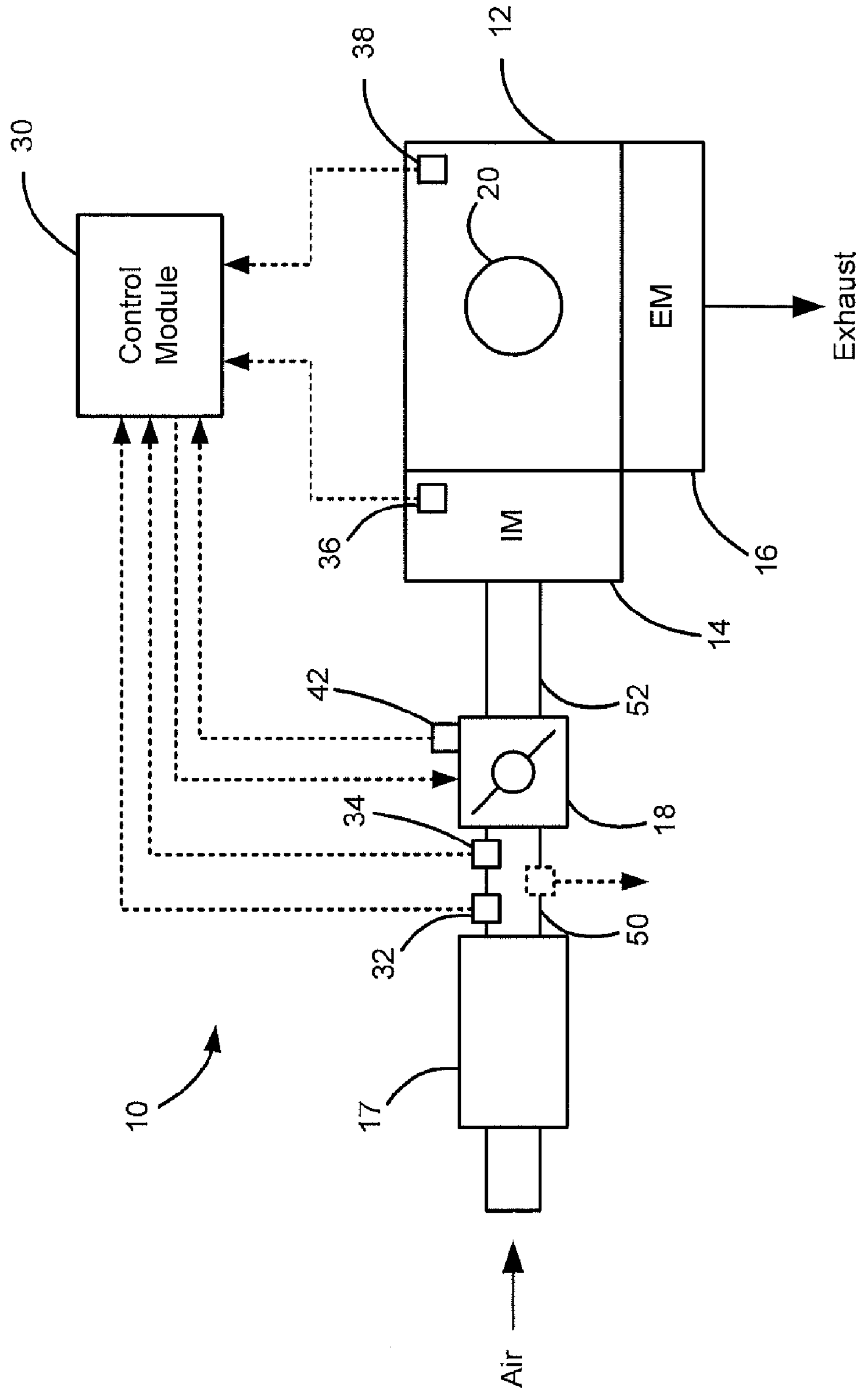
FIG. 1 is a functional block diagram of an internal combustion engine system that is regulated in accordance with the adaptive barometric pressure estimation control of the present disclosure.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary internal combustion engine system 10 is illustrated. The engine system 10 includes an engine 12, an intake manifold 14 and an exhaust manifold 16. Air is drawn into the intake manifold 14 through an air filter 17 and a throttle 18. The air is mixed with fuel, and the fuel and air mixture is combusted within a cylinder 20 of the engine 12. More specifically, the fuel and air mixture is compressed within the cylinder 20 by a piston (not shown) and combustion is initiated. The combustion process releases energy that is used to reciprocally drive the piston within the cylinder 20. Exhaust that is generated by the combustion process is exhausted through the exhaust manifold 16 and is treated in an exhaust after-treatment system (not shown) before being released to atmosphere. Although a single cylinder 20 is illustrated, it is anticipated that the pre-throttle estimation control of the present invention can be implemented with engines having more than one cylinder.

A control module 30 regulates engine operation based on a plurality of engine operating parameters including, but not limited to, a pre-throttle static pressure ($P_{PRE}$), a pre-throttle stagnation pressure ($P_{PRE0}$) (i.e., the air pressures upstream of the throttle), an intake air temperature ($T_{PRE}$), a mass air flow (MAF), a manifold absolute pressure (MAP), an effective throttle area ($A_{EFF}$), an engine RPM and a barometric pressure ($P_{BARO}$). $P_{PRE0}$ and $P_{PRE}$ are determined based on a pre-throttle estimation control, which is disclosed in commonly assigned, co-pending U.S. patent application Ser. No. 11/464,340, filed Aug. 14, 2006.

$T_{PRE}$, MAF, MAP and engine RPM are determined based on signals generated by a $T_{PRE}$ sensor 32, a MAF sensor 34, a MAP sensor 36 and an engine RPM sensor 38, respectively, which are all standard sensors of an engine system. $A_{EFF}$ is determined based on a throttle position signal that is generated by a throttle position sensor, which is also a standard sensor. A throttle position sensor 42 generates a throttle position signal (TPS). The relationship between $A_{EFF}$ to TPS is pre-determined using engine dynamometer testing with a temporary stagnation pressure sensor 50 (shown in phantom in FIG. 1) installed. Production vehicles include the relationship pre-programmed therein and therefore do not require the presence of the stagnation pressure sensor.

The $P_{BARO}$ estimation control of the present disclosure estimates $P_{BARO}$ without the use of a barometric pressure sensor. More specifically, in the air intake system, the mass air flow (MAF) or $\dot{m}$ can be treated as an incompressible flow before the throttle. Accordingly, $\dot{m}$ can be determined based on the following relationship:

$$\dot{m}=C_d \cdot A_{INLET} \cdot \sqrt{2 \cdot \rho \cdot (P_{BARO}-P_{PRE})} \quad (1)$$

where:

$\dot{m}$ is the rate of mass air flow (MAF);

$C_d$ is a drag or loss coefficient;

$A_{INLET}$ is the effective cross-sectional area of pre-throttle inlet system including air filter;

$P_{PRE}$ is the inlet or pre-throttle absolute pressure; and $\rho$ is the air density (i.e., a function of $P_{INLET}$, IAT, R).

Equation 1 can be transformed to provide the following relationship:

$$P_{BARO} = P_{PRE} + \frac{\left(\frac{\dot{m}}{C_d \cdot A_{INLET}}\right)^2}{2\rho} \quad (2)$$

$C_d$ can be determined as a function of $\dot{m}$ and an air filter healthy status (AFHS). The AFHS is a variable that indicates the degree to which the air filter is dirty. A clean air filter enables a minimally restricted air flow therethrough, while a dirty air filter more significantly restricts the air flow therethrough. The learning of AFHS can be independent of barometric conditions and can be updated within the control module 30. The AFHS can be determined based on one of the following relationships:

$$AFHS = f_1\left[\frac{(P_{BARO} - P_{PRE})_t - (P_{BARO} - P_{PRE})_{t-1}}{\dot{m}_t - \dot{m}_{t-1}}\right] \quad (3)$$

where t is a current time of a measured flow rate and t−1 is a previous time of another measured flow rate. $P_{PRE}$ can be either physically measured or calculated from throttle flow dynamics. AFHS is learned using minimum resources. More specifically, AFHS is event-based calculated using a known $P_{BARO}$, but is a more slowly updated variable than a time-based calculation of $P_{BARO}$. For example, the values of $(P_{BARO}-P_{PRE})_t$ and $(P_{BARO}-P_{PRE})_{t-1}$ can be determined over a long time period provided that the value $(\dot{m}_t-\dot{m}_{t-1})$ ($\Delta\dot{m}$) is greater than a threshold value ($\Delta\dot{m}_{THR}$). Further, $P_{BAROt}$ and $P_{BAROt-1}$ can be different in this case.

Under limited operating conditions, the AFHS can be determined based on the following relationship:

$$AFHS = f_2\left[\frac{(P_{PRE})_t - (P_{PRE})_{t-1}}{\dot{m}_t - \dot{m}_{t-1}}\right] \quad (4)$$

For example, if the difference between time steps ($\Delta t$) is less than a threshold difference ($\Delta t_{THR}$) and the vehicle travel distance ($\Delta d$) is less than a threshold difference ($\Delta d_{THR}$) (i.e., the vehicle does not move too far), it can be assumed that any change in $P_{BARO}$ is negligible.

Figure 2:
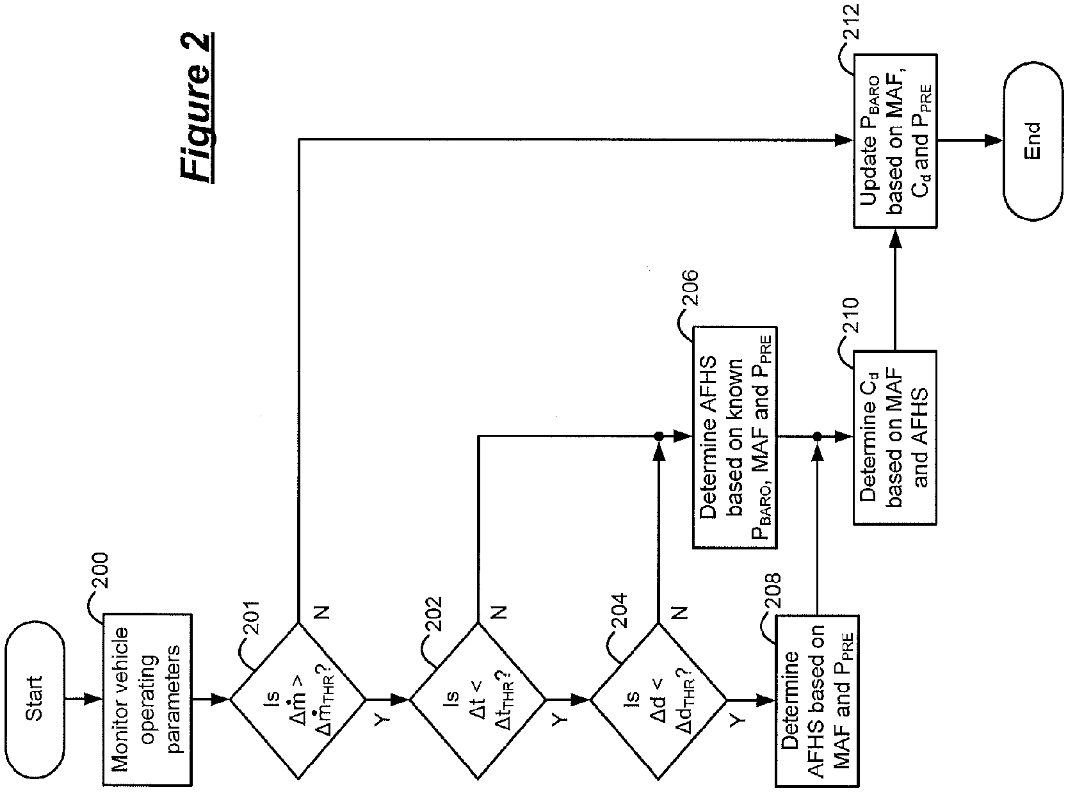
FIG. 2 is a flowchart illustrating exemplary steps that are executed by the adaptive barometric pressure estimation control of the present disclosure.

Referring now to FIG. 2, exemplary steps that are executed by the $P_{BARO}$ estimation control will be described in detail. In step 200, control initializes $C_d$ and monitors the vehicle operating parameters. In step 201, control event-based determines whether $\Delta\dot{m}$ is greater than $\Delta\dot{m}_{THR}$. If $\Delta\dot{m}$ is greater than $\Delta\dot{m}_{THR}$, control continues in step 202. If $\Delta\dot{m}$ is not greater than $\Delta\dot{m}_{THR}$, control continues in step 212. In step 202, control determines whether the time difference ($\Delta t$) between the sufficiently high airflow rate change is less than $\Delta t_{THR}$. If $\Delta t$ is less than $\Delta t_{THR}$, control continues in step 204. If $\Delta t$ is not less than $\Delta t_{THR}$, control continues in step 206. In step 204, control determines whether $\Delta d$ is less than $\Delta d_{THR}$. If $\Delta d$ is less than $\Delta d_{THR}$, control continues in step 208. If $\Delta d$ is not less than $\Delta d_{THR}$, control continues in step 206. In step 206, control determines AFHS based on MAF ($\dot{m}$), $P_{PRE}$ and a known $P_{BARO}$, and control continues in step 210. In step 208, control determines AFHS based on MAF and $P_{PRE}$ and control continues in step 210. In step 210, control determines $C_d$ based on MAF and AFHS. In step 212, control updates $P_{BARO}$ based on MAF, $C_d$ and $P_{PRE}$ and control ends. The engine can be subsequently operated based on the updated $P_{BARO}$.

Figure 3:
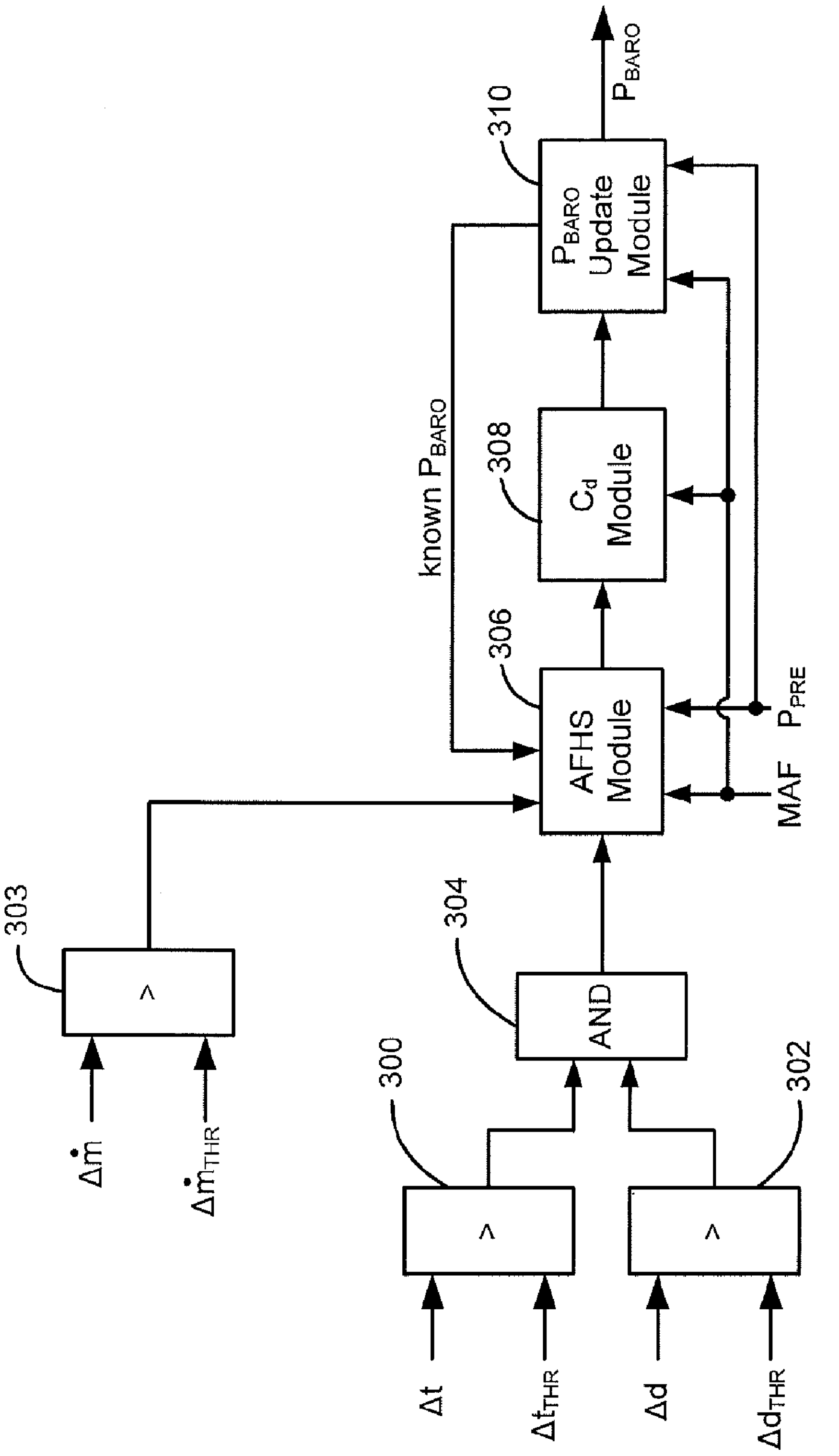
FIG. 3 is a functional block diagram illustrating exemplary modules that execute the adaptive barometric pressure estimation control.

Referring now to FIG. 3, exemplary modules that execute the $P_{BARO}$ estimation control will be described in detail. The exemplary modules include a first comparator module 300, a second comparator module 302, a third comparator module 303, an AND module 304, an AFHS module 306, a $C_d$ module 308 and a $P_{BARO}$ update module 310. The first comparator module 300 determines whether $\Delta t$ is less than $\Delta t_{THR}$ and outputs a corresponding signal to the AND module 304. Similarly, the second comparator module 302 determines whether $\Delta d$ is less than $\Delta d_{THR}$ and outputs a corresponding signal to the AND module 304.

The AND module 304 generates a signal indicating the manner in which AFHS is to be calculated based on the outputs of the first, second and third comparator modules 300, 302, 303. For example, if the first comparator module 300 indicates that $\Delta t$ is less than $\Delta t_{THR}$ and the second comparator module 302 indicates that $\Delta d$ is less than $\Delta d_{THR}$, the signal generated by the AND module 304 indicates that AFHS is to be determined based on $P_{PRE}$ and MAF. If, however, the first comparator module 300 indicates that $\Delta t$ is not less than $\Delta t_{THR}$ or the second comparator module 302 indicates that $\Delta d$ is not less than $\Delta d_{THR}$, the signal generated by the AND module 304 indicates that AFHS is to be determined based on $P_{PRE}$, MAF and a known $P_{BARO}$. The third comparator module 303 determines whether $\Delta\dot{m}$ is greater than $\Delta\dot{m}_{THR}$ and outputs a corresponding signal to the AFHS module 306.

The AFHS module 306 determined AFHS based on MAF, $P_{PRE}$ and a known $P_{BARO}$, depending upon the output of the AND module 304. The $C_d$ module 308 determines $C_d$ based on AFHS and MAF. The $P_{BARO}$ update module 310 updates $P_{BARO}$ based on $C_d$, MAF and $P_{PRE}$. The engine can be subsequently operated based on the updated $P_{BARO}$.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of determining a barometric pressure of atmosphere, in which an internal combustion engine of a vehicle is located, comprising:

monitoring operating parameters of the internal combustion engine and the vehicle;

determining a healthy status of an air filter of the internal combustion engine;

determining a drag coefficient of an air intake system of the internal combustion engine based on at least one of said operating parameters and said healthy status; and calculating the barometric pressure based on said operating parameters, said drag coefficient and said healthy status of said air filter.

2. The method of claim 1 further comprising determining whether at least one of said operating parameters is less than a corresponding threshold, wherein said healthy status of said air filter is determined based on a known barometric pressure if said at least one of said operating parameters is not less than said corresponding threshold.

3. The method of claim 2 wherein said at least one operating parameter includes a time difference between update times of the barometric pressure.

4. The method of claim 2 wherein said at least one operating parameter includes a travel distance of the vehicle.

5. The method of claim 1 wherein said healthy status is determined based on a pre-throttle inlet pressure.

6. The method of claim 5 wherein said pre-throttle inlet pressure is determined based on an intake air temperature.

7. The method of claim 5 wherein said pre-throttle inlet pressure is monitored using a sensor.

8. The method of claim 1 wherein said operating parameters comprise a mass air flow, an effective intake cross-sectional area, an air density and a pre-throttle inlet pressure.

9. A system for determining a barometric pressure of atmosphere, in which an internal combustion engine of a vehicle is located, comprising:

a first module that monitors operating parameters of the internal combustion engine and the vehicle, wherein the operating parameters comprise one of a travel distance of the vehicle and a time difference between update times of the barometric pressure;

a second module that determines a healthy status of an air filter of the internal combustion engine; and a third module that calculates the barometric pressure based on said operating parameters and said healthy status of said air filter, wherein the barometric pressure is calculated based on at least one of the time difference and the travel distance exceeding a threshold.

10. The system of claim 9 further comprising a fourth module that determines a drag coefficient of an intake system of the internal combustion engine based on at least one of said operating parameters and said healthy status, wherein said barometric pressure is calculated based on said drag coefficient.

11. The system of claim 9 further comprising a fourth module that determines whether at least one of said operating parameters is less than a corresponding threshold, wherein said healthy status of said air filter is determined based on a known barometric pressure if said at least one of said operating parameters is not less than said corresponding threshold.

12. The system of claim 9 wherein said healthy status is determined based on a pre-throttle inlet pressure.

13. The system of claim 12 wherein said pre-throttle inlet pressure is determined based on an intake air temperature.

14. The system of claim 12 further comprising a sensor that monitors said pre-throttle inlet pressure.

15. The system of claim 9 wherein said operating parameters comprise a mass air flow, an effective intake cross-sectional area, an air density and a pre-throttle inlet pressure.

16. A method of regulating operation of an internal combustion engine of a vehicle, comprising:

monitoring operating parameters of the internal combustion engine and the vehicle, wherein the operating parameters comprise an effective intake cross-sectional area of a pre-throttle inlet system;

determining a healthy status of an air filter of the internal combustion engine;

calculating a barometric pressure of atmosphere, in which the internal combustion engine is located, based on said operating parameters and said healthy status of said air filter; and regulating operation of the vehicle based on said barometric pressure.

17. The method of claim 16 further comprising determining a drag coefficient of an intake system of the internal combustion engine based on at least one of said operating parameters and said healthy status, wherein said barometric pressure is calculated based on said drag coefficient.

18. The method of claim 16 further comprising determining whether at least one of said operating parameters is less than a corresponding threshold, wherein said healthy status of said air filter is determined based on a known barometric pressure if said at least one of said operating parameters is not less than said corresponding threshold.

19. The method of claim 18 wherein said at least one operating parameter includes a time difference between update times of the barometric pressure.

20. The method of claim 18 wherein said at least one operating parameter includes a travel distance of the vehicle.

21. The method of claim 16 wherein said healthy status is determined based on a pre-throttle inlet pressure.

22. The method of claim 21 wherein said pre-throttle inlet pressure is determined based on an intake air temperature.

23. The method of claim 21 wherein said pre-throttle inlet pressure is monitored using a sensor.

* * * * *